United States Patent
Shoji et al.

(10) Patent No.: US 6,512,074 B2
(45) Date of Patent: Jan. 28, 2003

(54) POLYMERIZATION CATALYSTS OF OXIRANE COMPOUNDS AND PROCESS FOR PREPARING POLYMERS OF OXIRANE COMPOUNDS USING THE CATALYSTS

(75) Inventors: Shigeru Shoji, Osaka (JP); Yasumi Shimizu, Osaka (JP); Katsuhito Miura, Osaka (JP)

(73) Assignee: Daiso Co., Ltd., Osaka (JP)

( * ) Notice: Subject to any disclaimer, the term of this patent is extended or adjusted under 35 U.S.C. 154(b) by 0 days.

(21) Appl. No.: 09/891,383

(22) Filed: Jun. 27, 2001

(65) Prior Publication Data

US 2002/0013388 A1 Jan. 31, 2002

(30) Foreign Application Priority Data

Jun. 28, 2000 (JP) ........................................ 2000-193798

(51) Int. Cl.[7] ................................................ C08G 59/68
(52) U.S. Cl. .......................... 528/89; 502/155; 502/167; 502/171; 528/94; 528/416
(58) Field of Search ................................. 502/155, 167, 502/171; 528/89, 94, 416

(56) References Cited

U.S. PATENT DOCUMENTS 4,299,944 A * 11/1981 Maeda

FOREIGN PATENT DOCUMENTS

| JP | 46-027534 | 8/1971 |
| JP | 50124999 | * 10/1975 |
| JP | 56-051171 | 1/1981 |
| JP | 56-008852 | 2/1981 |

OTHER PUBLICATIONS

"Epoxide Polymers: Synthesis, Stereochemistry, Structure, and Mechanism*" Vandenberg, E.J.; *Journal of Polymer Science: Part A–1* (1969) vol. 7, pp. 525–567.

* cited by examiner

*Primary Examiner*—Robert Dawson
*Assistant Examiner*—D. Aylward
(74) *Attorney, Agent, or Firm*—Armstrong, Westerman & Hattori, LLP

(57) ABSTRACT

Polymerization catalysts of oxirane compounds are catalysts which are suitable to carry out suspension precipitation polymerization of the oxirane compounds in an organic solvent which cannot dissolve the polymers and comprise a reaction product of (A) an alkylaluminum compound, (B) an oxoacid compound of phosphorus having at least one OH group in its molecule and (C) a nitrogen-containing cyclic compound having pKa of 6 to 8. A process for preparing the polymers of the oxirane compounds is a process wherein the monomeric oxirane compounds are subjected to the suspension precipitation polymerization in the organic solvent which cannot dissolve the polymers in the presence of the catalysts to prepare the polymers of the oxirane compounds.

6 Claims, No Drawings

POLYMERIZATION CATALYSTS OF OXIRANE COMPOUNDS AND PROCESS FOR PREPARING POLYMERS OF OXIRANE COMPOUNDS USING THE CATALYSTS

BACKGROUND OF THE INVENTION

1. Field of the Invention

The present invention relates to polymerization catalysts which are suitable for preparing polymers of oxirane compounds such as ethylene oxide, epichlorohydrin and allyl glycidyl ether by suspension precipitation polymerization and to a process for preparing polymers of oxirane compounds using the polymerization catalysts.

2. Description of the Prior Art

Since polymers of oxirane compounds having various properties can be obtained by using a variety of oxirane compounds as a starting material, the polymers are used in very wide fields such as rubber parts for automobiles, rubber members for electrical and electronic equipments, polymers for various plastics blending and solid polyelectrolytes.

Industrial processes for preparing the polymers of oxirane compounds are exemplified by solution polymerization wherein the oxirane compounds are polymerized in an organic solvent which can dissolve monomers and the polymers and by suspension precipitation polymerization wherein the oxirane compounds are polymerized in an organic solvent which cannot dissolve the polymers to precipitate granular polymers. The latter polymerization process has advantages in that concentrations of the monomers can be raised during polymerization, and the polymers can be readily separated from the solvents after polymerization, while specific catalysts and solvents must be selected.

Catalysts which can polymerize the oxirane compounds are exemplified by catalysts having actions of Lewis acids such as boron fluoride, aluminum chloride, tin chloride and iron chloride. When polymerization is carried out by using these catalysts, relatively low-molecular weight (for example, molecular weight of several thousand to around fifty thousand) polymers are obtained.

It is known to use reaction products of alkylzinc with water, reaction products of organotin compounds with phosphates, reaction products of alkylaluminum with water, reaction products of alkylaluminum with phosphoric acid compounds or the like as catalysts in order to obtain high-molecular weight polymers which are useful in specific fields such as rubber industry. In particular, as the catalysts containing alkylaluminum, catalysts prepared by adding, to the reaction products of alkylaluminum with water, further chelating agents such as acetylacetone (for example, see J. Polym. Sci. A-1, 7, 525 (1969)), catalysts prepared by adding, to the reaction products of alkylaluminum with the phosphoric acid compounds, further the third component(s) consisting of amine compounds, organophosphorus compounds and/or organoarsenic compounds (see Japanese Examined Patent Publication No. 27534/1971), catalysts prepared by adding N-substituted morpholine such as N-ethylmorpholine to the reaction products of alkylaluminum with the phosphoric acid compounds (see Japanese Examined Patent Publication No. 8852/1981) and catalysts prepared by adding 1, 8-diazabicyclo[5.4.0]-7-undecene to the above-mentioned reaction products (see Japanese Examined Patent Publication No. 51171/1981) were proposed as excellent catalysts to obtain high-molecular weight polymers of the oxirane compounds.

However, most of the above-mentioned prior arts using the alkylaluminum catalysts relate to solution polymerization. Suspension precipitation polymerization of the oxirane compounds in the presence of these catalysts caused problems that the high-molecular weight polymers sometimes are not obtained, reaction mixture cannot be stirred in a reaction apparatus and the formed polymers cannot be taken out of the reaction apparatus since the polymers does not become granular but solid.

SUMMARY OF THE INVENTION

In view of the above-mentioned various problems, objects of the present invention are to provide catalysts which exhibit excellent activities on suspension precipitation polymerization and to provide a method wherein high-molecular weight polymers of oxirane compounds can be prepared effectively in high yields in the presence of the catalysts.

Studying variously in order to solve the above-mentioned problems, the present inventors found that in catalysts prepared by adding, to reaction products of alkylaluminum compounds with oxoacid compounds of phosphorus, further the third components, only the third components having specific structure and properties give catalysts for the suspension precipitation polymerization which exhibit excellent activities to obtain the high-molecular weight polymers of the oxirane compounds, and completed the present invention.

The polymerization catalysts of the oxirane compounds according to the present invention are catalysts which are suitable to carry out the suspension precipitation polymerization of the oxirane compounds in an organic solvent which cannot dissolve the polymers and are characterized by comprising a reaction product of (A) an alkylaluminum compound, (B) an oxoacid compound of phosphorus having at least one OH group in its molecule and (C) a nitrogen-containing cyclic compound having pKa of 6 to 8.

The process for preparing the polymers of the oxirane compounds according to the present invention is a process wherein the monomeric oxirane compounds are subjected to the suspension precipitation polymerization in the organic solvent which cannot dissolve the polymers in the presence of the catalysts having the above-mentioned characteristics to prepare the polymers of the oxirane compounds.

DETAILED DESCRIPTION OF THE PREFERRED EMBODIMENTS

The present invention is described in detail hereinafter.

The alkylaluminum compounds to be used in the catalysts according to the present invention are represented by the general formula:

$$(R_7)_p AlX_{3-p}$$

wherein $R_7$ is lower alkyl such as alkyl having one to six carbon atoms, X is halogen or hydrogen, and p is 1, 1.5, 2 or 3.

Examples of the alkylaluminum compound are triethylaluminum, diethylaluminum chloride, ethylaluminum sesquichloride [$Et_3Al_2Cl_3$], triisobutylaluminum, diisobutylaluminum hydride, tri-n-butylaluminum, tri-n-propylaluminum and the like. These compounds can be used solely or in combination depending on the monomeric oxirane compounds to be used.

The oxoacid compounds of phosphorus to be used in the catalysts according to the present invention have at least one OH group in their molecules. Examples of the oxoacid compound of phosphorus are inorganic phosphoric acids such as phosphorous acid, diphosphorous acid, hypophosphorous acid, metaphosphoric acid, pyrophosphoric acid, orthophosphoric acid and polyphosphoric acid; organic phosphoric acids such as nitrilotris(methylenephosphoric acid) and 1-hydroxyethane-1, 1-diphosphonic acid; acidic phosphates, which are partially esterified products of alcohols with phosphoric acid; and the like. The acidic phosphates are represented by the general formula:

$$O=P(OR_8)_q(OH)_{3-q}$$

wherein $R_8$ is lower alkyl such as alkyl having one to six carbon atoms, and q is 1 or 2, and they can be exemplified by acidic methyl phosphate, acidic ethyl phosphate, acidic propyl phosphate, acidic isopropyl phosphate and acidic butyl phosphate. Further, it is preferable to use, as the oxoacid compound of phosphorus, phosphoric acid or a mixture of polyphosphoric acids represented by the following general formula [II] and having a corresponding $H_3PO_4$ content of 90 to 110% by weight (compounds having a corresponding $H_3PO_4$ content of higher than 100% by weight are usually called condensed phosphoric acids), since polymerization activities of the obtained catalysts on the oxirane compounds are raised,

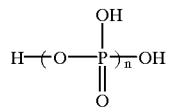

[II]

wherein n is an integer of 2 to 10.

Even if the phosphoric acid or the mixture contains a small amount of moisture, it does not cause any problems, but a large amount of moisture in the phosphoric acid or the mixture inhibits catalytic reactions, and the polymerization activities tend to be lowered. Accordingly, it is preferable to use the phosphoric acid or the mixture having a corresponding $H_3PO4$ content of 90% by weight or higher.

The nitrogen-containing cyclic compounds to be used in the catalysts according to the present invention can be compounds containing nitrogen as a member of their rings and/or compounds containing nitrogen in substituents of their rings. The nitrogen-containing cyclic compounds having pKa of 6 to 8 are compounds of which pKa values measured in aqueous solutions at 25° C. are in the range of 6 to 8, preferably 6.2 to 7.8. Examples of such nitrogen-containing cyclic compounds are alkyl-substituted pyridines such as 2, 4, 6-trimethylpyridine, 2, 3, 6-trimethylpyridine, 2, 4-dimethylpyridine, 2, 5-dimethylpyridine, 2, 6-dimethylpyridine, 3, 5-dimethylpyridine, 4-methylpyridine, 3-ethyl-6-methylpyridine, 4-isopropylpyridine, 2-propylpyridine and 2, 3, 5, 6-tetramethylpyridine; amino-containing pyridines such as 4-amino-3-bromomethylpyridine, 4-amino-3-bromopyridine, 2-amino-3-methylpyridine, 2-amino-4-methylpyridine, 2-amino-5-methylpyridine, 2-amino-6-methylpyridine, 2-aminopyridine, 3-aminopyridine, 3-bromo-4-(dimethylamino)pyridine, 3-bromo-4-methylaminopyridine and 4-(dimethylamino)pyridine; alkoxypyridines such as 4-ethoxypyridine and 4-methoxypyridine; N-substituted morpholines such as N-ethylmorpholine and N-methylmorpholine; substituted anilines such as N, N-diethylaniline, N-tert-butylaniline and N, N-dimethylaniline; substituted phenanthrolines such as 1, 10-dimethoxy-3, 8-dimethyl-4, 7-phenanthroline and 1, 2, 3, 8, 9, 10-hexamethyl-4, 7-phenanthroline; substituted imidazoles such as 1-methylimidazole and 4-methylimidazole; substituted toluidines such as N, N-diethyl-o-toluidine and N, N-dimethyl-p-toluidine; substituted pyrrolines such as 2-cyclohexyl-2-pyrroline and 2-ethyl-2-pyrroline; 1-aminoisoquinoline, 2-aminoquinoline, N-(2-aminoethyl)piperidine, N-(2-aminoethyl)pyrrolidine, 4-chloro-2-nitrophenol and the like. A preferred nitrogen-containing cyclic compound is a compound selected from the group consisting of the alkyl-substituted pyridines, the alkoxypyridines, the substituted phenanthrolines, the substituted toluidines, the substituted pyrrolines, N-(2-aminoethyl)piperidine and N-(2-aminoethyl)pyrrolidine. Further, it is preferable to use the alkyl-substituted pyridines represented by the following general formula [I] as the nitrogen-containing cyclic compounds having pKa of 6 to 8, since catalytic activities and molecular weights of the obtained polymers of the oxirane compounds increase,

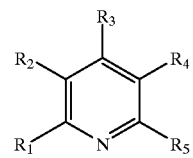

[I]

wherein $R_1$, $R_2$, $R_3$, $R_4$ and $R_5$, being the same or different, are hydrogen or lower alkyl such as alkyl having one to six carbon atoms.

Examples of the alkyl-substituted pyridine represented by the general formula [I] are 2, 4, 6-trimethylpyridine, 2, 3, 6-trimethylpyridine, 2, 4-dimethylpyridine, 2, 5-dimethylpyridine, 2, 6-dimethylpyridine, 3, 5-dimethylpyridine, 4-methylpyridine, 3-ethyl-6-methylpyridine, 4-isopropylpyridine, 2-propylpyridine, 2, 3, 5, 6-tetramethylpyridine and the like. Preferred alkyl-substituted pyridines are pyridines substituted by alkyl at least at the 2- and/or 6-position. A particularly preferred compound is 2, 4, 6-trimethylpyridine.

When the alkylaluminum compound, the oxoacid compound of phosphorus and the nitrogen-containing cyclic compound are reacted one another to synthesize the catalyst of the present invention, a mixing proportion of the nitrogen-containing cyclic compound is preferably 0.01 to 0.5 mole, more preferably 0.03 to 0.25 mole to one mole of the alkylaluminum compound. A mixing proportion of the oxoacid compound of phosphorus is appropriately selected depending on an OH number in its molecule and is preferably 0.01 to 2 moles to one mole of the alkylaluminum compound, more preferably in the molar range such that a total OH number is 0.6 to 1.2 to one mole of the alkylaluminum compound. When the mixing proportions deviate from these ranges, the polymerization activities of the resulting catalysts on the oxirane compounds tend to be lowered.

Reaction order of these three starting materials is not limited. First, the alkylaluminum compound can be reacted with the oxoacid compound of phosphorus, and then this reaction mixture can be reacted with the nitrogen-containing cyclic compound. Alternatively, first, the alkylaluminum compound can be reacted with the nitrogen-containing cyclic compound, and then this reaction mixture can be reacted with the oxoacid compound of phosphorus. There is no great difference in the polymerization activities of the obtained two catalysts on the oxirane compounds. Reaction temperatures of the above-mentioned reactions are appropriately selected depending on the alkylaluminum compounds or the oxoacid compounds of phosphorus to be used and are usually in the range of −20° to 120° C. It is preferable to carry out the reactions to synthesize the catalysts under an atmosphere of an inert gas such as a nitrogen gas without solvent or in an inert solvent. The inert solvent is not limited and can be exemplified by aliphatic hydrocarbons such as hexane, heptane, cyclohexane and octane; aromatic hydrocarbons such as benzene, toluene and xylene; ethers such as diethyl ether, dipropyl ether, methyl butyl ether and dimethoxyethane; and the like. These solvents are used solely or as mixed solvents.

The catalysts obtained by reacting the alkylaluminum compounds with the oxoacid compounds of phosphorus and the nitrogen-containing cyclic compounds are very suitable for the suspension precipitation polymerization of the oxirane compounds. Examples of polymerable oxirane compounds are alkylene oxides such as ethylene oxide, propylene oxide, butene oxide, isobutylene oxide and butadiene monoxide; substituted alkylene oxides such as epichlorohydrin, epibromohydrin, methacryl chloride oxide, trifluoromethylethylene oxide, dichloroisobutylene oxide and styrene oxide; alicyclic epoxides such as cyclohexene oxide and vinylcyclohexene oxide; glycidyl ethers such as allyl glycidyl ether, phenyl glycidyl ether, chloroethyl glycidyl ether, methyl glycidyl ether, 2-methoxyethyl glycidyl ether, 2-(2-methoxyethoxy)ethyl glycidyl ether, cyclohexyl glycidyl ether and benzyl glycidyl ether; glycidyl esters such as glycidyl acrylate and glycidyl methacrylate; and the like. It is preferable to carry out homopolymerization of the oxirane compounds represented by the following general formula [III] or copolymerization of two or more compounds among them, because polymerization rates and molecular weights of the resulting polymers increase,

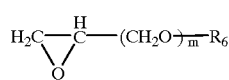

[III]

wherein m is 0 or 1, $R_6$ is hydrogen, or alkyl, cycloalkyl, phenyl, aralkyl, alkenyl or (meth)acryloyl which can have substituent(s), and the substituent is halogen, methoxy, ethoxy or methoxyethoxy.

The polymerization process according to the present invention is a process wherein the monomeric oxirane compounds are subjected to the suspension precipitation polymerization in the presence of the above-mentioned catalysts in an organic solvent which is inert on the monomers and does not dissolve the resulting polymers to prepare the polymers of the oxirane compounds.

The monomers can be both soluble and insoluble in the organic solvent and are preferably at least partly soluble in the solvent. Examples of such solvents are aliphatic hydrocarbons such as hexane, heptane, cyclohexane and octane; aromatic hydrocarbons such as benzene, toluene and xylene; ethers such as diethyl ether, dipropyl ether, methyl butyl ether and dimethoxyethane; and the like. The solvent is appropriately selected depending on the oxirane compounds to be used and polymerization temperature. The aliphatic hydrocarbons are preferably used.

Mixing proportions of the monomeric oxirane compound, the organic solvent and the catalyst are usually preferably in the ranges of 100 to 1000 parts by weight of the organic solvent and 0.01 to 5 parts by weight of the catalyst to 100 parts by weight of the oxirane compound. The polymerization temperature is not limited, is usually in the range of −20° to 150° C. and is appropriately selected depending on activities of the catalysts and, the organic solvents and the oxirane compounds to be used. The polymerization is usually carried out with stirring.

EXAMPLES

Embodiment to carry out the present invention is described by the following Examples. However, the present invention is not limited to the following Examples as far as the present invention does not deviate from its gist.

Example 1

Into a glass flask having capacity of 200 ml whose interior had been replaced with nitrogen gas was introduced 98 ml of a solution of triisobutylaluminum in hexane (triisobutylaluminum 15% by weight). A solution prepared by dissolving 1.42 g of phosphoric acid (corresponding to 100% by weight of $H_3PO_4$) in 100 ml of diethyl ether was added gradually to the solution of triisobutylaluminum in hexane with stirring while adjusting reaction temperature to about 5° C. to react them. To this reaction mixture was added 0.5 ml of 2, 4, 6-trimethylpyridine (pKa=7.43) as a nitrogen-containing cyclic compound with stirring, and the stirring was continued for one hour at 60° C. to prepare a catalyst.

Next, into a stainless steel reaction chamber having capacity of 5 liters whose interior had been replaced with nitrogen gas were introduced 600 ml of epichlorohydrin and 3 liters of hexane, the total amount of the catalyst was added thereto, and a polymerization reaction was carried out for six hours while stirring the whole at 20° C. Granular polymers having a diameter of about 1 mm were precipitated in the reaction chamber.

Example 2

A catalyst was prepared by the same procedure as in Example 1 except that 0.5 ml of 2, 4-dimethylpyridine (pKa=6.74) was used as the nitrogen-containing cyclic compound, and a polymerization reaction was carried out by using this catalyst. Granular polymers having a diameter of about 1 mm were precipitated in a reaction chamber.

Example 3

A catalyst was prepared by the same procedure as in Example 1 except that 0.5 ml of N-ethylmorpholine (pKa=7.7) was used as the nitrogen-containing cyclic compound, and a polymerization reaction was carried out by using this catalyst. Granular polymers having a diameter of about 1.5 mm were precipitated in a reaction chamber.

Example 4

A catalyst was prepared by the same procedure as in Example 1 except that 0.5 ml of N, N-diethylaniline (pKa=6.56) was used as the nitrogen-containing cyclic compound, and a polymerization reaction was carried out by using this catalyst. Granular polymers having a diameter of about 1 mm were precipitated in a reaction chamber.

Example 5

A catalyst was prepared by the same procedure as in Example 1 except that 0.5 ml of 3, 5-dimethylpyridine (pKa=6.09) was used as the nitrogen-containing cyclic compound, and a polymerization reaction was carried out by using this catalyst. Granular polymers having a diameter of about 1.5 mm were precipitated in a reaction chamber.

Example 6

A catalyst was prepared by the same procedure as in Example 1 except that 17 g of acidic ethyl phosphate (phosphorus content: 21% by weight), which is partial ethyl ester of phosphoric acid, was used as the oxoacid compound of phosphorus, and a polymerization reaction was carried out by using this catalyst. Granular polymers having a diameter of about 2.5 mm were precipitated in a reaction chamber.

Example 7

A catalyst was prepared by the same procedure as in Example 1 except that 1.2 g of phosphoric acid in the form of an aqueous solution (corresponding to 85% by weight of $H_3PO_4$) was used as the oxoacid compound of phosphorus, and a polymerization reaction was carried out by using this catalyst. Granular polymers having a diameter of about 1 mm were precipitated in a reaction chamber.

Example 8

A catalyst was prepared by the same procedure as in Example 1 except that 98 ml of triethylaluminum (15% by weight hexane solution) was used as the alkylaluminum compound and 2.5 g of phosphoric acid (corresponding to 100% by weight of $H_3PO_4$) and 0.8 ml of 2, 4, 6-trimethylpyridine were added thereto, and a polymerization reaction was carried out by using this catalyst. Granular polymers having a diameter of about 1.5 mm were precipitated in a reaction chamber.

Example 9

The catalyst was prepared by the same procedure as in Example 1, and then a polymerization reaction was carried out by the same procedure as in Example 1 except that 500 ml of epichlorohydrin and 200 ml of ethylene oxide were used as the oxirane compounds. Granular copolymers having a diameter of about 1 mm were precipitated in a reaction chamber.

Example 10

The catalyst was prepared by the same procedure as in Example 1, and then a polymerization reaction was carried out by the same procedure as in Example 1 except that 400 ml of propylene oxide, 300 ml of ethylene oxide and 30 ml of allyl glycidyl ether were used as the oxirane compounds. Granular terpolymers having a diameter of about 1 mm were precipitated in a reaction chamber.

Example 11

The catalyst was prepared by the same procedure as in Example 1, and then a polymerization reaction was carried out by the same procedure as in Example 1 except that 600 ml of styrene oxide was used as the oxirane compound. Granular polymers having a diameter of about 1.5 mm were precipitated in a reaction chamber.

Comparative Example 1

A catalyst was prepared by the same procedure as in Example 1 except that 0.5 ml of triethanolamine (pKa=7.76) was used instead of 2, 4, 6-trimethylpyridine, and a polymerization reaction was carried out by using this catalyst. A lump of viscous polymer was formed in a reaction chamber.

Comparative Example 2

A catalyst was prepared by the same procedure as in Example 1 except that 0.5 ml of 1, 8-diazabicyclo[5.4.0]-7-undecene (pKa=12.5) was used as the nitrogen-containing cyclic compound, and a polymerization reaction was carried out by using this catalyst. Large granular polymers having a diameter of about 20 mm were precipitated in a reaction chamber.

Comparative Example 3

A catalyst was prepared by the same procedure as in Example 1 except that 0.5 ml of 2-ethylpyridine (pKa=5.89) was used as the nitrogen-containing cyclic compound, and a polymerization reaction was carried out by using this catalyst. Large granular polymers having a diameter of about 15 mm were precipitated in a reaction chamber.

Comparative Example 4

A catalyst was prepared by the same procedure as in Example 1 except that 0.5 ml of morpholine (pKa=8.49) was used as the nitrogen-containing cyclic compound, and a polymerization reaction was carried out by using this catalyst. A lump of viscous polymer was formed in a reaction chamber.

Evaluation of Polymers

The resulting polymers were dried in vacuo sufficiently, and then their weights were measured to determine polymer yields. The resulting polymers were dried in vacuo and then dissolved in dimethylformamide. Molecular weights of the polymers were determined by gel permeation chromatography, and further their weight-average molecular weights were calculated in terms of standard polystyrene. These evaluation results are shown in Table 1.

TABLE 1

| | pKa of nitrogen-containing cyclic compound | State of precipitated polymer | Polymer yield (%) | Weight-average molecular weight |
|---|---|---|---|---|
| Example 1 | 7.43 | Granular | 96 | 1,800,000 |
| Example 2 | 6.74 | Granular | 90 | 1,750,000 |
| Example 3 | 7.7 | Granular | 68 | 1,680,000 |
| Example 4 | 6.56 | Granular | 62 | 1,710,000 |
| Example 5 | 6.09 | Granular | 73 | 1,580,000 |
| Example 6 | 7.43 | Granular | 70 | 1,480,000 |
| Example 7 | 7.43 | Granular | 65 | 1,980,000 |
| Example 8 | 7.43 | Granular | 76 | 1,310,000 |
| Example 9 | 7.43 | Granular | 73 | 1,510,000 |
| Example 10 | 7.43 | Granular | 79 | 1,380,000 |
| Example 11 | 7.43 | Granular | 51 | 1,690,000 |
| Comparative Example 1 | 7.76 | Lump | 18 | 410,000 |
| Comparative Example 2 | 12.5 | Lump | 63 | 1,200,000 |
| Comparative Example 3 | 5.89 | Lump | 60 | 1,250,000 |
| Comparative Example 4 | 8.49 | Lump | 22 | 480,000 |

Aspects of the precipitated polymers clearly show that when epichlorohydrin is polymerized by using the catalysts obtained in Examples 1 to 8, the fine granular homopolymers are obtained, and these catalysts are suitable for suspension precipitation polymerization. Table 1 also explicitly shows that polymer yields and molecular weights of the resulting polymers are both high. The granular polymers were obtained in all of Examples 9 to 11 wherein the copolymerization was carried out by using the different monomers, and polymer yields and molecular weights of the resulting polymers were both high in these Examples as well.

On the other hand, in Comparative Example 1 wherein triethanolamine, which is an acyclic nitrogen-containing compound, was used and in Comparative Example 4 wherein morpholine, which is a nitrogen-containing cyclic compound having pKa of higher than 8, was used, only the viscous polymers were obtained, and polymer yields and molecular weights of the polymers were both low. In Comparative Example 2 wherein 1, 8-diazabicyclo[5.4.0]-7-undecene whose pKa value deviates from a range of 6 to 8 was used and in Comparative Example 3 wherein 2-ethylpyridine was used, polymer yields and molecular weights of the polymers were quite high, but the polymers were obtained in the form of large granules. Accordingly, these compounds are found to be unsuitable for the catalysts for suspension precipitation polymerization.

Polymerization catalysts of oxirane compounds according to the present invention are suitable for suspension precipitation polymerization so that high-molecular weight polymers are obtained in high yields by using these catalysts. Accordingly, upgraded polymers of oxirane compounds can be obtained efficiently and easily to apply them to very wide fields such as rubber parts for automobiles, rubber members for electrical and electronic equipments, polymers for various plastics blending and solid polyelectrolytes by using the catalysts according to the present invention.

What is claimed is:

1. A polymerization catalyst of an oxirane compound for a reaction wherein the oxirane compound is subjected to suspension precipitation polymerization in an organic solvent which cannot dissolve a polymer, characterized by comprising a reaction product of (A) an alkylaluminum compound, (B) an oxoacid compound of phosphorus having at least one OH group in its molecule and (C) a nitrogen-containing cyclic compound having pKa of 6 to 8, wherein (C) the nitrogen-containing cyclic compound having pKa of 6 to 8 is a compound selected from the group consisting of akyl-substituted pyridines, alkoxypyridines, substituted phenanthrolines, substituted toluidines, substituted pyrrolines, N-(2-aminoethyl) piperidine and N-(2-aminoethyl)pyrrolidine.

2. A polymerization catalyst of an oxirane compound for a reaction wherein the oxirane compound is subjected to suspension precipitation polymerization in an organic solvent which cannot dissolve a polymer, characterized by comprising a reaction product of (A) an alkylaluminum compound, (B) an oxoacid compound of phosphorus having at least one OH group in its molecule and (C) a nitrogen-containing cyclic compound having pKa of 6 to 8, wherein (C) the nitrogen-containing cyclic compound having pKa of 6 to 8 is alkyl-substituted pyridine represented by the following general formula [I],

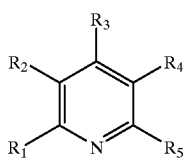

[I]

wherein $R_1$, $R_2$, $R_3$, $R_4$ and $R_5$, being the same or different, are hydrogen or lower alkyl.

3. A polymerization catalyst of an oxirane compound for a reaction wherein the oxirane compound is subjected to suspension precipitation polymerization in an organic solvent which cannot dissolve a polymer, characterized by comprising a reaction product of (A) an alkylaluminum compound, (B) an oxoacid compound of phosphorus having at least one OH group in its molecule and (C) a nitrogen-containing cyclic compound having pKa of 6 to 8, wherein (C) the nitrogen-containing cyclic compound having pKa of 6 to 8 is alkyl-substituted pyridine represented by the following general formula [I],

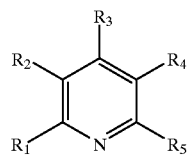

[I]

wherein $R_1$, $R_2$, $R_3$, $R_4$ and $R_5$, being the same or different, are hydrogen or lower alkyl, and wherein (C) the nitrogen-containing cyclic compound having pKa of 6 to 8 is 2, 4, 6-trimethylpyridine.

4. A polymerization catalyst of an oxirane compound as claimed in claim 1, wherein (B) the oxoacid compound of phosphorus having at least one OH group in its molecule is phosphoric acid or a mixture of polyphosphoric acids represented by the following general formula [II] and having a corresponding $H_3PO_4$ content of 90 to 110% by weight,

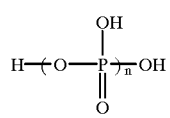

[II]

wherein n is an integer of 2 to 10.

5. A polymerization catalyst of an oxirane compound as claimed in any one of claims 1 to 4, wherein the oxirane compound is a compound represented by the following general formula [III],

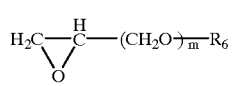

[III]

wherein m is 0 or 1, $R_6$ is hydrogen, or alkyl, cycloalkyl, phenyl, aralkyl, alkenyl or (meth)acryloyl which can have a substituent, and the substituent is halogen, methoxy, ethoxy or methoxyethoxy.

6. A process for preparing a polymer of an oxirane compound in which the oxirane compound is subjected to suspension precipitation polymerization in an organic solvent which cannot dissolve the polymer in the presence of the catalyst to prepare the polymer of the oxirane compound, characterized in that the catalyst as claimed in any on of claims 1 to 4 is used.

* * * * *